March 28, 1950 D. N. MOCK 2,501,782
CORN PICKER
Filed April 11, 1947

INVENTOR.
DELBERT N. MOCK
BY
Martin E Anderson
ATTORNEYS

Patented Mar. 28, 1950

2,501,782

UNITED STATES PATENT OFFICE 2,501,782

CORN PICKER

Delbert N. Mock, Haxtun, Colo.

Application April 11, 1947, Serial No. 740,879

5 Claims. (Cl. 56—110)

This invention relates to improvements in corn pickers of the type employed by farmers for picking and husking standing corn.

In those parts of our country where corn is raised in considerable quantities, it is customary to employ machines for picking and husking the corn. In most of the corn raising states in the central and eastern part of the country, the stalks are usually very tall and rugged and it is very seldom that such corn stalks fall over, and therefore the machines employed are constructed in such a manner that they will operate with the maximum efficiency in connection with standing corn where the ears are located a considerable distance above the ground.

In some of the western semiarid states, the corn stalks do not grow to any great height and do not have the strength of the corn stalks in the eastern corn belt, and therefore it often happens that, due to windstorms and other causes, the corn stalks are broken or bent over to such an extent that the ears of corn are positioned so close to the ground that machines designed for operation in other parts of the country can not be successfully employed.

It is the object of this invention to produce an improved corn picker of such construction that it can be successfully used in the picking of corn in the semiarid states and which shall be so designed that it will gather ears from stalks that have been blown over by a storm or which for other reasons have fallen to the ground.

This invention, in its broadest aspect, is constructed on well known lines, but has been modified so as to adapt it for the purpose above specified.

It is the principal object of this invention to produce a corn picker of such construction that the gathering and snapping rollers will terminate as close to the ground as possible so as to put them in position to gather all corn ears, regardless of whether the stalks are standing or have fallen over.

Having thus, in a general way, described the objects of this invention and its construction, the latter will now be described in greater detail, and for this purpose, reference will be had to the accompanying drawing in which the invention has been illustrated in its preferred form, and in which.

Figure 1:
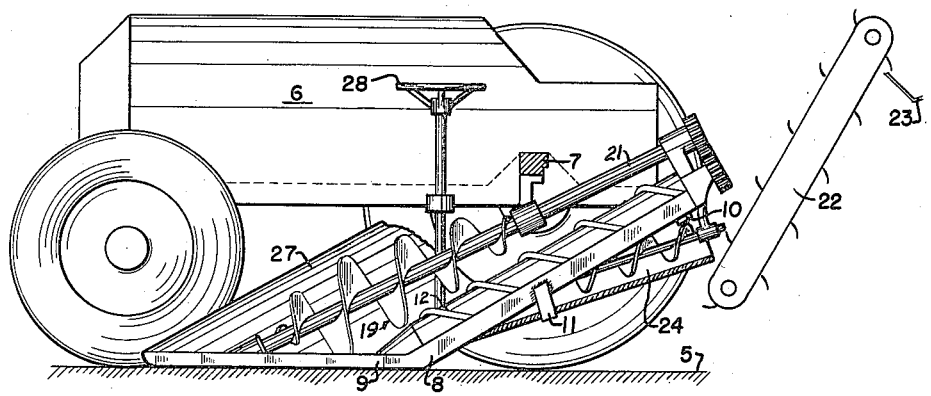
Figure 1 is a side elevation of the improved corn picker showing the same in the relation which it bears to the operating tractor, parts of the corn picker having been removed so as to more clearly disclose the construction.

In the drawing reference numeral 5 designates the surface on which the picker is supported and reference numeral 6 designates the outline of a tractor while reference numeral 7 indicates the tractor bracket from which the drive wheels are supported.

Figure 2:
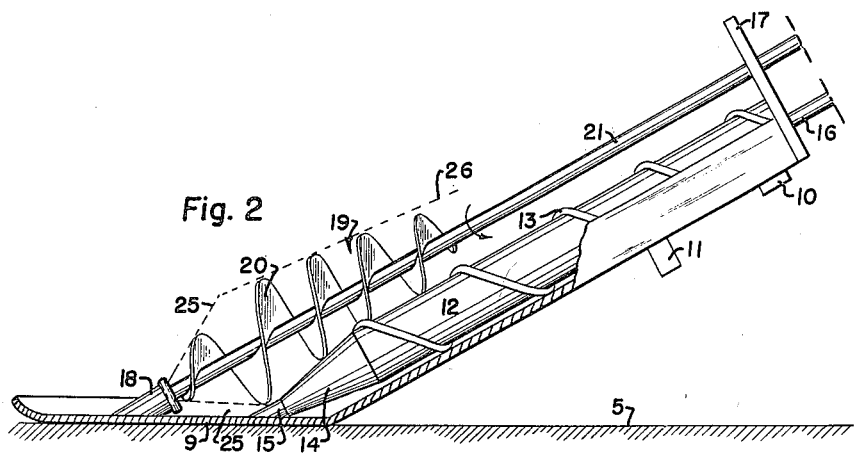
Figure 2 is a section taken on line 2—2, Figure 3.
Figure 3:
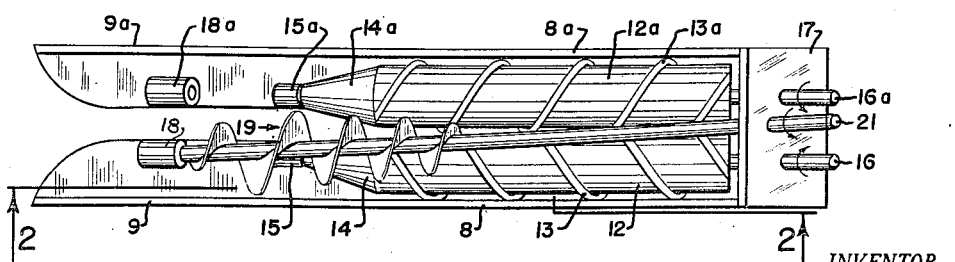
Figure 3 is a top plan view of the assembly shown in Figure 2.

Attached to the tractor between the body of the tractor and one drivewheel is the corn picker that forms the subject of this invention. The corn picker comprises a frame having two members 8, 8a which are made from angle iron. The frame members have a straight section and terminate near their lower ends in forwardly projecting runner portions 9, 9a, respectively, that are adapted to slide on the ground surface in the manner of sled runners. The frame members are connected at their upper ends by some suitable means, such as a bar 10 and are supported from the tractor by some suitable means which has been indicated in a general way by reference numeral 11. The frame members 8, 8a are provided, respectively, with snapping rollers 12, 12a. These rollers may be constructed in any approved manner, but have been shown as provided, respectively, with helical ribs 13, 13a, the ribs on one roller being reversed in pitch as shown. The lower ends of the snapping rollers are tapered as indicated at 14, 14a and are mounted for rotation in bearings 15, 15a positioned at their respective lower ends. The upper ends of the snapping rollers have shafts 16, 16a extending axially therefrom and these are mounted for rotation in suitable bearings in a part of the frame which has been indicated by reference numeral 17. The upper surface of each sled runner portion 9, 9a is provided with a bearing 18, 18a, respectively, in which the lower end of a screw conveyor is mounted for rotation. The screw conveyor has been designated in its entirety by reference numeral 19 and consists of a helical blade 20 carried by a shaft 21. The upper end of the shaft is journaled in frame part 17 as shown in Figures 2 and 3. Suitable means is provided for rotating the snapping rollers and the screw conveyor, the snapping rollers being rotated in opposite directions so that their inner surfaces move downwardly; this has been designated by arrows in Figure 3. The screw conveyor 19 is rotated in the direction indicated by the arrow in Figure 3, which rotation tends to move any material in contact with the spiral blade 20, upwardly along the snapping rollers.

In Figure 1 an endless belt conveyor 22 has been indicated for the purpose of elevating the corn to a chute 23. A second screw conveyor 24 is positioned adjacent the snapping rollers, as indicated in Figure 1, and receives the corn ears and conveys them to the conveyor 22. The tractor, belt conveyor 22, and screw conveyor 24 have been omitted from Figures 2 and 3 to simplify the disclosure and to emphasize only the essential parts of the claimed invention.

Attention is called at this point to the shape of the screw conveyor 20. From Figure 2 it will be seen that the blade of this screw conveyor is tapered at its lower end in such a way that the outer edge of the first turn will generate a cone whose surface has been designated by a dotted line that, in turn, has been identified by reference numeral 25. The edge of the helical blade 20, therefore, follows a line practically parallel with the upper surfaces of runners 9, 9a and in close proximity to them.

The edge of the first complete turn of blade 20, when rotating, generates a frusto-conical surface in close proximity to the upper surfaces of the runners and therefore so close to the ground on which the runners rest that blade 20 will pick up an ear of corn lying on the ground. Of course anything that has been gathered by the rotating conveyor blade 20 will be moved toward the snapping rollers, whether this be a corn stalk with ears attached thereto, or a detached ear of corn. If the stalk carries an ear attached thereto, the latter will be snapped by the action of rollers 12 in a well known manner. Screw conveyor 19 is effective for moving short stalks of corn upwardly into engagement with the snapping rollers and serves to bring any fallen corn stalks up from the ground to such an extent that they will be brought into operative position for engagement with the snapping rollers.

An inspection of Figure 2 will show that the screw conveyor 19 is so constructed that the edges of the blade follow or generate two coaxial conical surfaces, the one at the lower end having a steep vertical angle and the other tapering upwardly. The surfaces have been indicated by broken lines and designated by reference numerals 25 and 26.

Corn pickers of the general type to which this invention relates are constructed more or less along the lines indicated in Figure 1 of patent No. 786,239, granted March 28, 1905, from which it will be seen that the snapping rollers and the forwardly feeding roller are both located a considerable distance above the ground and it is obvious that such construction will not pick up fallen stalks or corn ears.

Applicant's invention, as above intimated, resides in the construction illustrated in the drawing in which the parts are brought into close contact with the ground, in which position they will effectively pick up fallen stalks and even ears of corn that have become separated from the stalk.

The finished corn picker is, of course, provided with shields somewhat like that indicated by reference numeral 27, one of which is associated with each runner. These shields serve a well known and understood purpose and it is to be understood that they are provided wherever necessary, either for the protection of the operator or to improve the operation of the machine.

Means comprising a handwheel like that designated by reference numeral 28 in Figure 1 is provided for raising the front end of the picker during transportation. If the picker is positioned on the other side of the tractor, the lower end of conveyor 19 is pivoted in bearing 18a on the other frame member provided therefor and shown in Figure 3.

Having described the invention what is claimed as new is:

1. In a corn picker, a frame having two upwardly ranging spaced frame members, a snapping roll rotatably connected with each frame member for rotation in opposite directions about spaced parallel axes, the lower ends of the frame members being normally horizontal, bearings positioned adjacent the intersection of the two angularly related portions, a single spiral blade conveyor positioned above the snapping rolls, a bearing for the lower end of said conveyor positioned on one of the horizontal portions of the frame, a bearing for the upper end of said conveyor, the spiral blade of the conveyor increasing in diameter from its lower end to a point adjacent the lower ends of the snapping rolls to such a degree that the edge of the blade generates the surface of a cone whose lowermost element is substantially horizontal, and in close proximity to the plane of the upper surface of the horizontal lower ends of the frame members.

2. In a corn picker, a frame having two upwardly ranging spaced frame members, a snapping roll rotatably connected with each frame member for rotation in opposite directions about spaced parallel axes, the lower ends of the frame members being normally horizontal, bearings positioned adjacent the intersection of the two angularly related portions, a spiral blade conveyor positioned above the snapping rolls, a bearing for the lower end of said conveyor, positioned on one of the horizontal portions of the frame, a bearing for the upper end of said conveyor, the spiral blade of the conveyor increasing in diameter from its lower end to a point adjacent the lower ends of the snapping rolls to such a degree that the edge of the blade generates the surface of a cone whose lowermost element is substantially horizontal and positioned near the upper surface of the horizontal lower ends of the frame, that part of the conveyor above the base of the cone being upwardly tapering.

3. A corn picker of the type supported and moved by a tractor, comprising, two parallel, spaced frame members supported from the tractor in forwardly and downwardly inclined position, the lower ends of the frame members being angularly related to the upwardly ranging portions, forming substantially horizontal runners adapted to slide on the surface of the ground, a snapping roll rotatably connected with each frame member, the latter having bearings positioned near the junctures of the angularly related portions of the frames, the lower ends of the snapping rolls being journaled in the bearings, bearings at the upper ends of the frame members, the snapping rolls having shafts journaled in the last named bearings, one of the horizontal portions of the frame members having a bearing, a conveyor having a shaft with a helical blade disposed thereabout, the lower end of the shaft being journaled in the last named bearing, a bearing connected with the upper end of the frame, the shaft of the conveyor having its upper end journaled in the last named bearing, the edge of the conveyor blade adjacent the lower end, being spaced progressively farther from the axis of rotation to generate the surface of a cone when rotated, the apex angle of the cone being substantially twice the angle that its axis makes with the upper surface of the horizontal portion of the frame members, the surface generated by the edge of that portion of the blade above the base of the cone being frustoconical and upwardly tapering.

4. A corn picker in accordance with claim 3 wherein the upper end of the shaft of the conveyor is journaled substantially midway between the axes of rotation of the snapping rolls, and thereabove, and the lower end is journaled on the horizontal portion of the frame at a point directly ahead of the lower end of one of the snapping rolls, whereby the axis of rotation of the shaft is in non-parallel relation to the axis of rotation of both snapping rolls.

5. A corn picker in accordance with claim 4 wherein a bearing is provided on each horizontal portion of the frame to alternatively receive the lower end of the shaft of the conveyor, whereby the corn picker may be disposed on either side of the tractor with the conveyor shaft at the same included angle with respect to the longitudinal axis of the tractor.

DELBERT N. MOCK.

REFERENCES CITED

The following references are of record in the file of this patent:

UNITED STATES PATENTS

| Number | Name | Date |
|---|---|---|
| 808,465 | Meader | Dec. 26, 1905 |
| 1,800,058 | Dugger | Apr. 7, 1931 |
| 1,855,109 | Justman | Apr. 19, 1932 |
| 2,110,471 | Petruchin | Mar. 8, 1938 |